United States Patent [19]

Reed et al.

[11] 4,373,902
[45] Feb. 15, 1983

[54] IMMEDIATE IGNITION SMOKELESS BURNING OF WASTE GASES

[75] Inventors: Robert D. Reed; Robert E. Schwartz, both of Tulsa, Okla.

[73] Assignee: John Zink Company, Tulsa, Okla.

[21] Appl. No.: 228,139

[22] Filed: Jan. 26, 1981

[51] Int. Cl.³ .......................................... F23D 15/00
[52] U.S. Cl. .................................... 431/202; 431/5
[58] Field of Search .................... 431/202, 5, 190; 422/168

[56] References Cited

U.S. PATENT DOCUMENTS

| | | |
|---|---|---|
| 2,779,399 | 1/1957 | Zink et al. |
| 3,429,645 | 2/1969 | Reed |
| 3,512,911 | 5/1970 | Reed et al. |
| 3,539,285 | 11/1970 | Zink et al. |
| 3,628,903 | 12/1971 | Hoyt ................................. 431/202 |
| 3,697,231 | 10/1972 | Reed |
| 3,732,059 | 5/1973 | Goodnight et al. |
| 3,817,695 | 6/1974 | Reed et al. |
| 3,954,385 | 5/1976 | Reed et al. |
| 3,994,671 | 11/1976 | Straitz ............................... 431/202 |
| 4,052,142 | 10/1977 | Reed et al. |
| 4,084,935 | 4/1978 | Reed et al. |
| 4,105,394 | 8/1978 | Reed et al. |
| 4,128,389 | 12/1978 | Straitz ............................... 431/202 |

*Primary Examiner*—Edward G. Favors
*Attorney, Agent, or Firm*—Head, Johnson & Stevenson

[57] ABSTRACT

An apparatus for immediate ignition of waste gases and their smokeless burning which is built into a cylindrical stack, for the flow of waste gases. Near the top of the stack, there is positioned, coaxially, a steam-air pipe for supplying a mixture of steam and air. The steam and air are introduced into the pipe, by means of radial tubes, connected to a circular manifold on the outside of the stack. A circular cover plate or baffle over the steam-air pipe is supported by a plurality of broad strips equally spaced circumferentially, around the periphery of the steam-air pipe. There are a plurality of radial support arms between the stack and the steam-air pipe. These can be made from angle iron of sufficient width, the purpose being to deflect upwardly flow of the annular column of gas, to break it into a plurality of spaced circular segments of gas, the space above the arms protects a stable flame, for instant reignition of the mixture of gas, air and steam.

9 Claims, 9 Drawing Figures

IMMEDIATE IGNITION SMOKELESS BURNING OF WASTE GASES

BACKGROUND OF THE INVENTION

1. Field of the Invention

This invention lies in the field of the flaring of waste gases. More particularly it concerns a type of flare in which the gases are burned smokelessly.

2. Description of the Prior Art

In the prior art patents, such as U.S. Pat. Nos. 3,512,911, 3,539,285 and 4,084,935 describe apparatus for injecting steam-air centrally to a flared gas stream for the purpose of smokeless combustion. This invention is the result of a study to improve upon the teachings of the prior patents.

SUMMARY OF THE INVENTION

It is a primary object of this invention to provide an apparatus for combustion of waste gases for improved smokeless operation.

It is a further object of this invention to provide an improved smokeless combustion flare in which a steam-air mixture is provided to flow centrally inside of an annular wall of rising gas, with means at the top of the flare for outward radial flow of the steam-air mixture into the gas column.

It is a still further object of this invention to provide means for dividing the radial flow of steam-air into separate circumferentially spaced outward flows, so that gas can flow upwardly in the space between the separate steam-air flows, and to spread into the space inside of the annular flow of gas.

A still further object of this invention is to provide means to conduct secondary air from the outer periphery of the flare radially inwardly to the central core above the gas-air pipe.

These and other objects are realized and the limitations of the prior art are overcome in this invention by providing a riser tube or cylindrical stack of selected diameter for the flow of waste gases, to a selected height above the earth. Near the top portion of the flare the diameter is increased, so that a central coaxial steam-air pipe can be inserted, causing the flared gases to flow in the annular space between the central steam-air pipe, and the outer wall of the flare. The central steam-air pipe is supported and centralized by means of a plurality of spaced radial steam-air tubes of selected diameter, providing means for flow of steam and air into the closed bottom end of the steam-air pipe.

At the top of the steam-air pipe there is a baffle or cover plate, supported by a plurality of circumferentially spaced brackets, strips or legs, which are of selected width, so that they not only support the cover plate but also divide the outward radial flow of steam-air into a plurality of separated flows. Because of the deflection of the steam-air flow due to the cover plate, the flow is substantially radially into the rising annular column of flared gases to thoroughly and turbulently mix, for smokeless and complete combustion.

The top of the outer wall of the flare is slightly higher than the top of the steam-air pipe, so that there is mixture of steam-air and gas before the flow reaches the top of the outer wall where there are a plurality of igniters of conventional design, such as shown in U.S. Pat. Nos. 2,779,399 and 2,869,632.

Additional centralizing support is provided between the central steam-air pipe and the outer wall, by means of a plurality of radial spokes or bars, which not only serve the purpose of support, but are wide enough in construction, so that they divide the flow of gas into a plurality of separate annular segments. The space above these radial bars provides a low pressure area in and above them induced by the upward flow of flared gases. This low pressure creates an ignition 'bridge' by drawing flame from the igniter-induced burning gases into the are where the combustible mixture of flared gases and air-stream emerge where immediate endothermal smokeless reaction burning takes place.

BRIEF DESCRIPTION OF THE DRAWINGS

These and other objects and advantages of this invention and a better understanding of the principles and details of the invention will be evident from the following description taken in conjunction with the appended drawings, in which.

DETAILED DESCRIPTION OF THE PREFERRED EMBODIMENTS

Figure 1:
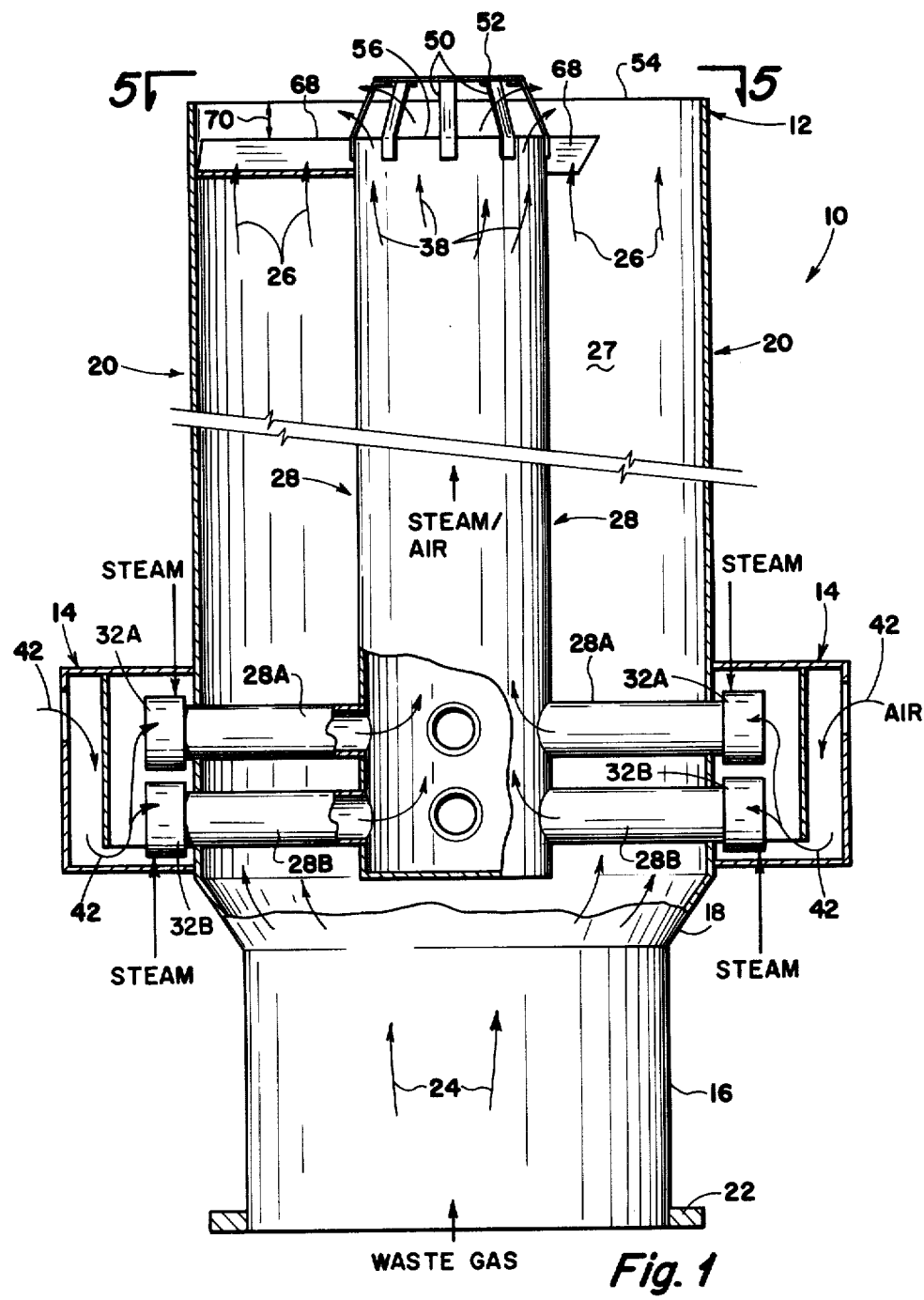
FIG. 1 is a vertical diametral cross-section of the apparatus of this invention taken across the plane 1—1 of FIG. 5.

Referring now to the drawings and in particular to FIG. 1 there is shown a vertical diametral cross-section of the improved waste gas flare. The portion 10 shown, is limited to the top, or combustion control portion, which is fitted to the top of the riser pipe of a conventional flare stack by means of a flange 22. No need is felt for description of the lower portion of the flare stack, since this can be conventional in all respects, except that the diameter of the flare stack and the diameter of the lower portion 16 of the combustion control portion of the flare, would be of the same diameter.

Arrows 24 illustrate the upward flow of waste gas from the riser pipe (not shown) into the bottom of the combustion portion 10. This flow of waste gas would normally be supplied to the bottom of the flare stacks in a conventional manner and rising as a circular cylindrical flow indicated by arrows 24.

The combustion section, which is of selected length, comprises a central pipe 28 of selected diameter and length, and an outer coaxial wall 20, which is of such diameter that the annular space 27 has substantially the same cross-section, as the lower cylindrical portion 16.

The lower portion of the steam-air pipe 28, which is closed off at its bottom end, is supported by a plurality of radial tubes 28A, 28B, etc., which not only provide mechanical support, but provide for the radial flow of steam-air mixture 38 into the steam-air pipe 28, for upward flow in accordance with the arrows 38. The top of the central steam-air pipe 28 is at a selected dimension 70 below the top 54 of the outer cylindrical wall 20. A horizontal circular baffle plate 52 is provided for a cover over the steam-air pipe, and is supported by a plurality of circumferentially positioned brackets, legs or straps 50, which are welded to the steam-air pipe 28 and the plate 52. The width of the support straps 50 is of critical dimension as will be more fully explained in FIGS. 2A and 2B.

The top end of the steam-air pipe is coaxially supported inside of the outer wall 20 by means of a plurality of circumferentially spaced radial baffle arms or bars 68. These can be of any selected cross-section, such as a horizontal strap or a circular pipe, or a piece of angle iron as shown, etc. A preferred construction involves the use of an angle iron which will be more fully described in FIGS. 6, 7 and 8. The radial bars not only provide support for the steam-air pipe, but because of their circumferential width which is of critical dimension they divide the annular flow of gas 26 into a separate circumferentially spaced plurality of circular segments, of the annular flow, for reasons which will be described later. The plurality of steam-air tubes 28A, 28B may be equal to, or different from, the number of radial bars 68. This will be further discussed in connection with FIG. 5.

There is a circumferential box, conduit or manifold 14 surrounding the lower portion of the combustion section of the flare, and a circular manifold for the supply of steam to the plurality of radial steam-air tubes 28A, 28B. The steam manifold is not shown but can be conventional and is well understood. This manifold construction and steam-air mixing will be further described in connection with FIGS. 3 and 4.

Figure 2A:
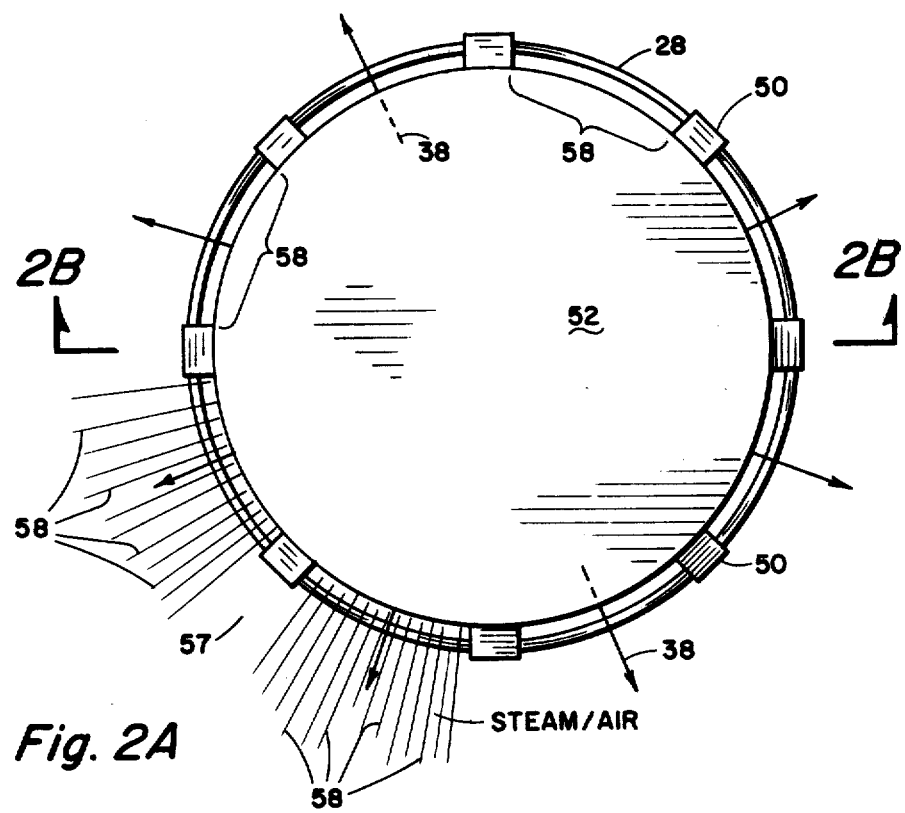
FIG. 2A is a plan view of the steam-air pipe taken across the plane 2—2 of FIG. 2B.
Figure 2B:
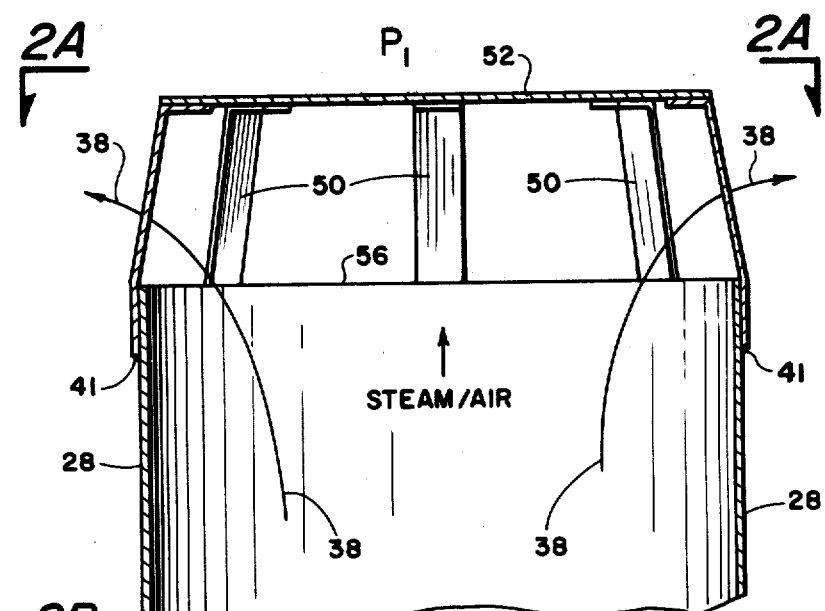
FIG. 2B is a diametral section of the top portion of the steam-air pipe, taken along the plane 2B—2B of FIG. 2A.

Referring now to FIGS. 2A and 2B there are shown respectively a plan view of the top of the steam-air pipe, and a vertical cross-section of the top portion of the steam-air pipe. The circular plate 52 provides a baffle plate over the steam-air pipe, so as to force the upward flow of steam-air 38 into a substantially outward radial flow, through the space provided between the top edge 56 of the pipe, the horizontal cover plate 52, and the circumferentially spaced support straps 50.

It is important that the width of the straps 50 be of a selected circumferential dimension, so that the flow 58 of the steam-air mixture between the straps 50 will be separated enough to provide a clear space 57 of lower pressure, permitting the riser of the vertical gas flow to pass between the flows 58 and to flow into the lower pressure area P1 which wlll be provided above the plate 52. The circumferential width of the straps 50 should be at least one inch or larger, depending on the dimensions of the steam-air pipe and the outer wall 20.

Figure 3:
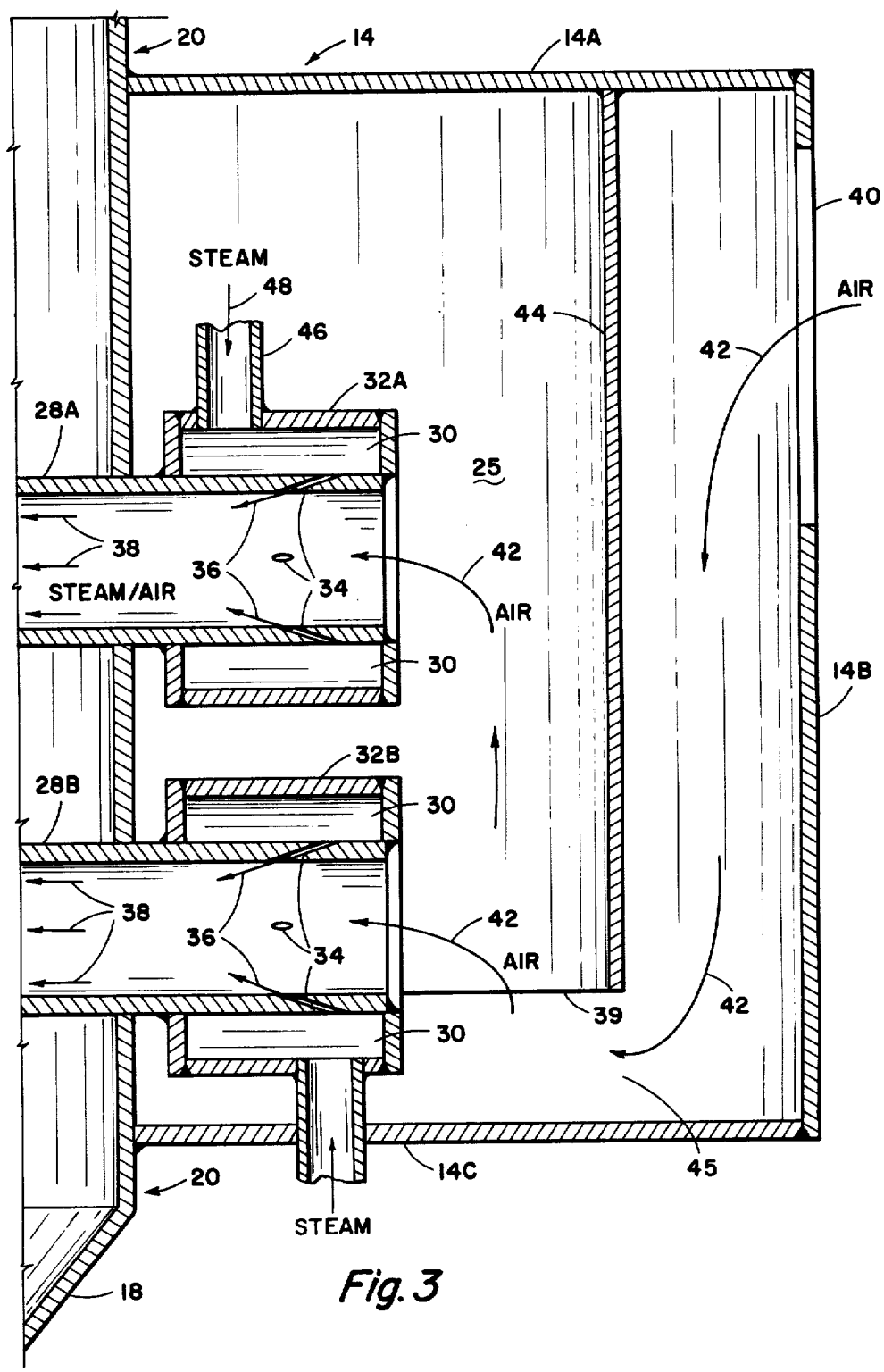
FIG. 3 is an enlarged view of the steam-air supply portion of FIG. 1.
Figure 4:
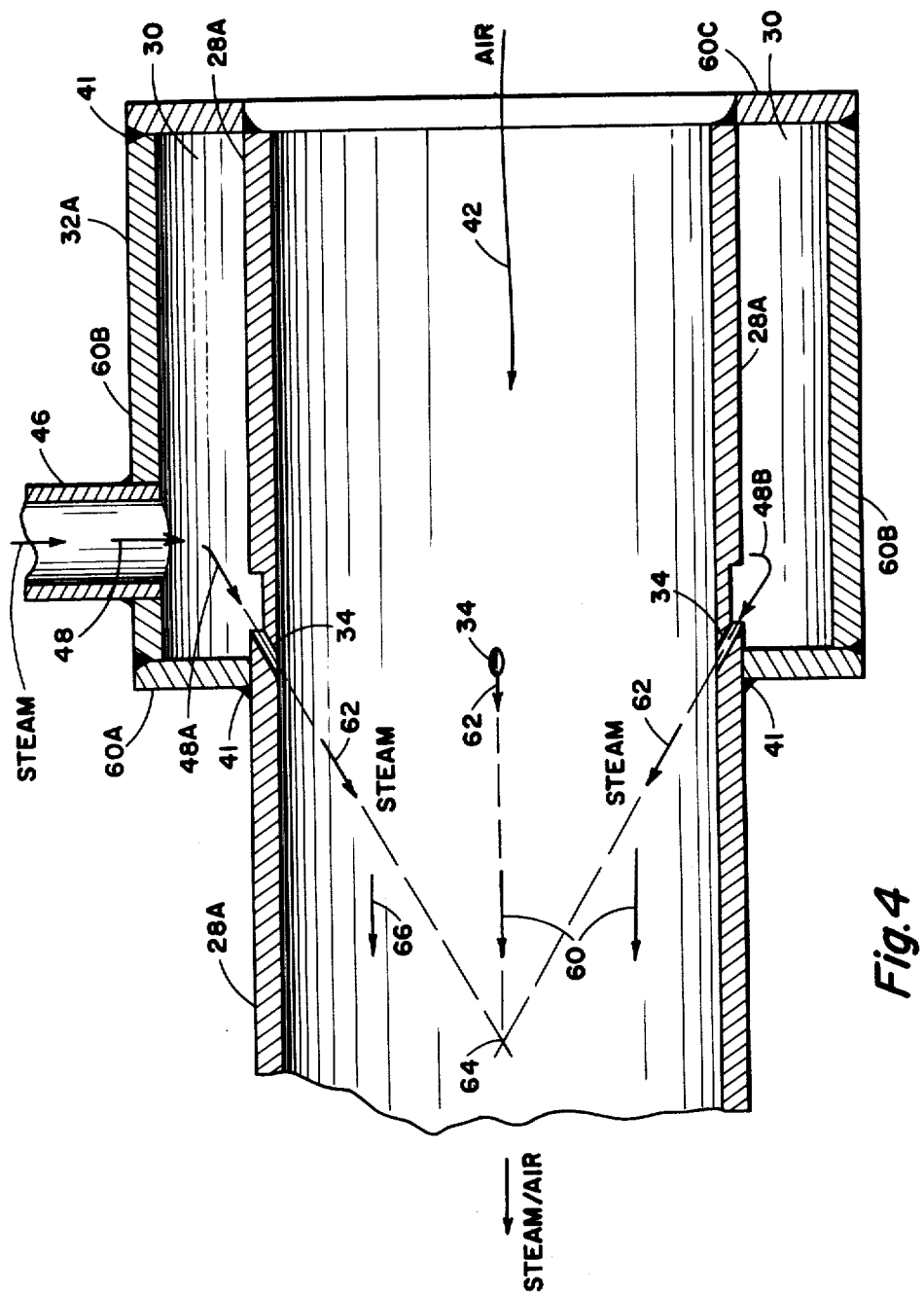
FIG. 4 is an enlarged view of the aspirator and steam-air combination and mixing portion of FIG. 3.

Referring now to FIGS. 3 and 4, in conjunction with FIG. 1 there is shown an enlarged view of the circular manifold box 14 for housing the steam-air aspirative injection means and to provide primary combustion air flow through a plurality of circumferentially spaced openings 40 in the outer wall 14B of the box 14.

The construction provides two annular plates 14A at the top and 14C at the bottom which are welded to the outer surface of the outer wall 20.

A circular baffle, dividing wall or curtain 44 is attached to and supported by the top plate 14A. This is of lesser dimension than the outer circumferential plate 14B, so as to provide flow of primary air 42 inwardly through the openings 40, down and through the space 45 under the bottom edge 39 of the wall 44, and into the exposed ends of the steam-air tubes 28A and 28B. The number and diameter of the radial steam-air tubes 28A and 28B should be such that the total cross-section for flow of steam-air in these smaller tubes is substantially equal to the cross-sectional area of the steam-air pipe 28.

The manifold 14 is constructed as shown, as a piezometric control to maintain the pressure in space 25 (FIG. 3) substantially constant at atmospheric pressure. This makes it possible for the steam aspirator to be described to provide a constant steam-air ratio, in any condition of wind action or direction outside 14B.

Annular boxes 32A and 32B around the outer ends of the steam air tubes 28A and 28B, etc. have an annular space 30, and serve as plena for the distribution of steam, which enters these plena by means of pipes 46, in accordance with arrow 48. Only one such pipe 46 is shown although it will be clear that each of the plena 30 will require a means for inflow of steam in a conventional manner. It would be well known in the art how to connect a source of steam at selected pressure to the plena 30.

FIG. 4 shows an enlarged view of one of the pipes 28A, illustrating the construction of the steam plenum 30. This comprises an annular plate 60A, a cylindrical plate 60B and an outer annular plate 60C. The central opening in the annular plate 60C is of the dimension of the pipe 28A for inflow of primary combustion air 42.

There are a plurality of small circumferentially spaced orifices 34, drilled through the wall of tubes 28A, 28B, etc., so that the steam pressure in the plenum 30, which should be about 100 p.s.i. gauge, is dropped to atmospheric pressure, with a consequent high velocity of the jets 62. The orifices are drilled through the wall of the pipe 28A in an angular direction, so that their axes intersect at a point 64 along the axis of the pipe 28A. The high velocity of the steam jets causes an aspirator effect to induce air and a thorough turbulent mixing of the steam with the air in the pipes 28A, 28B. This flow of steam-air mixture continues upwardly in the steam-air pipe 28 to the top.

Figure 5:
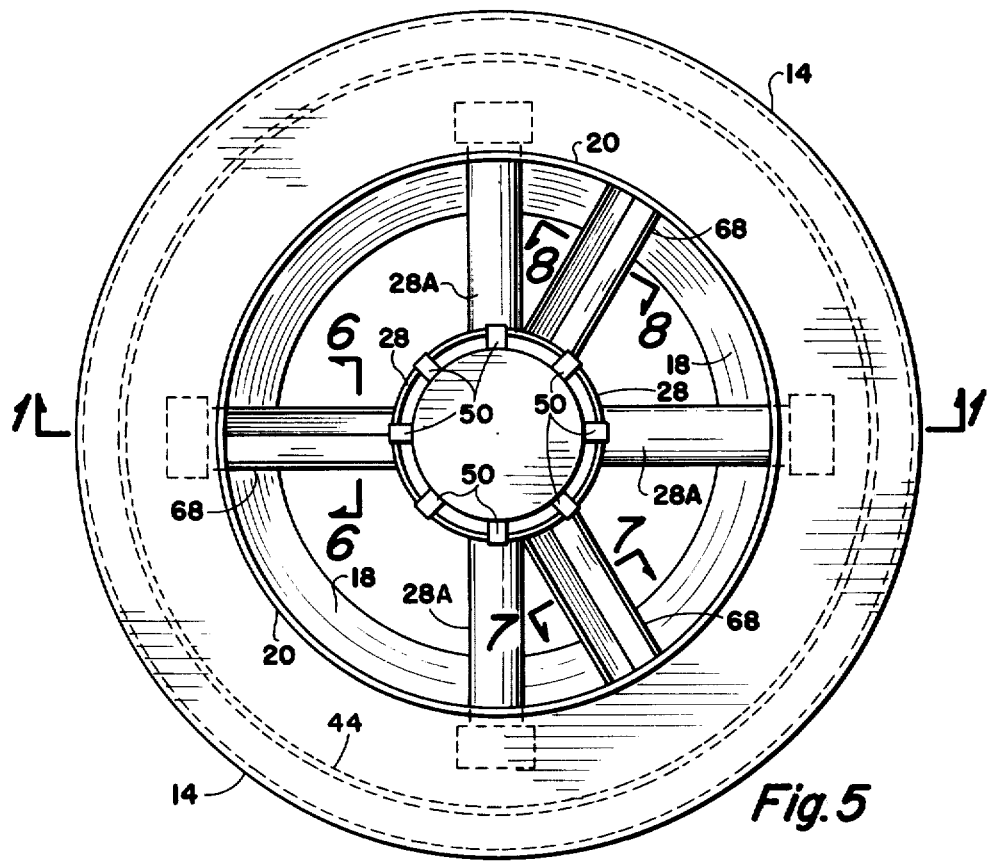
FIG. 5 is a plan view of the entire flare taken across the plane 5—5 of FIG. 1.

Referring now to FIG. 5, there is shown a plan view taken across the plane 5—5 of FIG. 1. The outer wall 20 of the flare, supporting the air manifold 14, which has the downwardly depending wall 44 shown in dashed outline. The steam-air pipe 28 is shown supported by the circular tubes 28A near the bottom, and the radial angle bars 68 near the top.

For purposes of illustration there are shown four sets of radial tubes 28A and three radial bars 68. This choice of numbers is for convenience only, and any number greater than three would be satisfactory. Nor do the numbers of tubes and bars have to be equal to each other, since there is sufficient vertical separation between the tubes 28A and the bars 68, so that the annular flow of gas through the space 27 will be uniform as it approaches the bars, irrespective of the number of pipes 28A which disturb the flared gas flow at the lower end of the combustion portion.

The support straps 50 are shown in a manner similar to that of FIG. 2A so that there are a plurality of radial flows of steam-air substantially horizontal, between the straps 50. Thus, there will be a series of narrow spaces 57 between the flows 58 from the steam-air pipe 28, and the top plate 52. The specific dimension of the plate 52 should be of the order of magnitude of the diameter of the steam-air pipe 28, which should be at least 35% of the cross section of the outer wall 20, to provide a substantially horizontal component to the flow 58 of steam-air 38.

Figure 7:
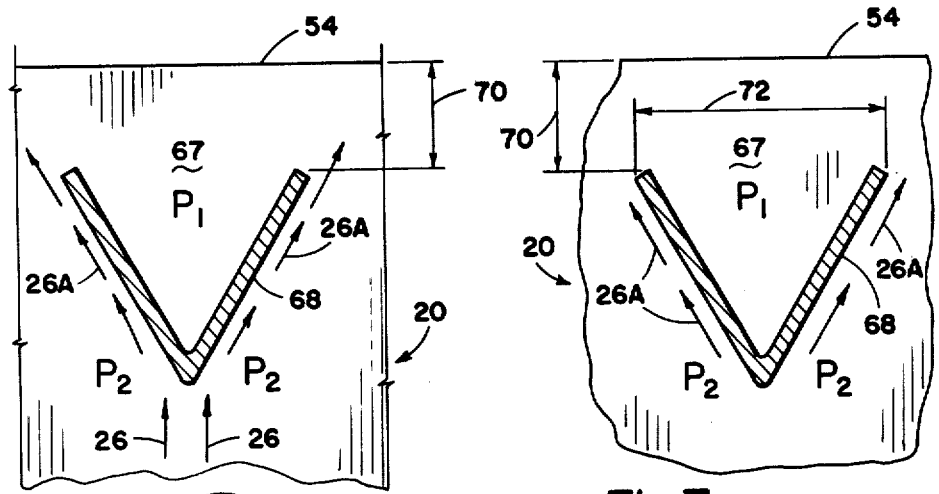
FIGS. 6, 7 and 8 show various portions of the radial steam-air tubes, and the radial bars, which provide for separation of the annular gas flow into a plurality of circumferentially spaced separate segments of the annular gas flow, respectively.
Figure 8:
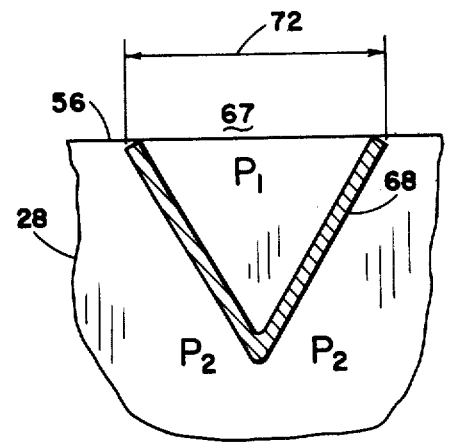
Figure 6:
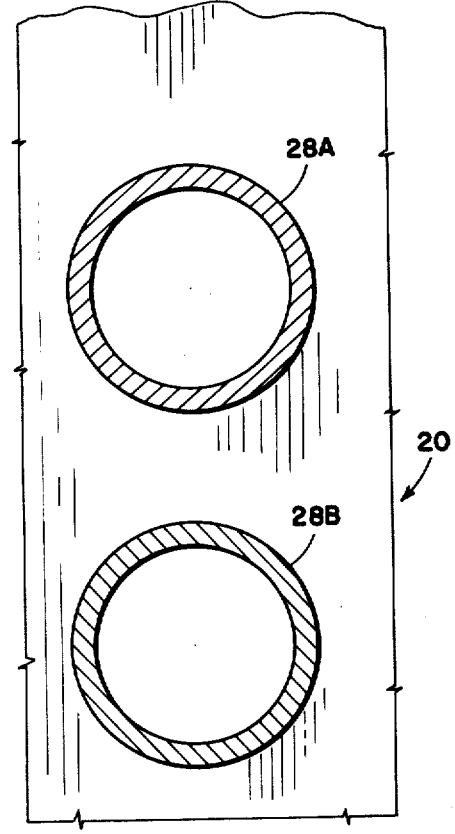

Referring now to FIGS. 6, 7 and 8 a vertical portion of the inner surface of the outer wall 20 is shown with the pipes 28A, 28B near the bottom end, and the radial bar 68 near the top. As shown in FIG. 8 the top edge of the bars 68 are even with the top 56 of the steam-air pipe 28, although they are at a selected dimension 70 below the top edge 54 of the outer wall 20.

FIG. 6 is a cross-section taken across the plane 6—6 of FIG. 5, and illustrates the upward flow 26 of gas past the bars by the arrows 26A. The annular gas flow in the space below the bars is labeled 26. As the gas flows upwardly 26A along the edges of the V-shaped bars 68, there will be higher velocity of gas on the sides of the bars and lowering of pressure to a value P1 immediately above the bars 68. This lowering of pressure forms a quiet zone in which there is extremely stable burning along the radial length of 68 (FIG. 5) to maintain stable burning of flared gases above 52 and above 20 at all times. This reignition area above the bars provides for continuous combustion.

FIG. 7 shows details similar to FIG. 6 and is taken across the plane 7—7 of FIG. 5.

The third FIG. 8 illustrates the same shaped bars 68 but indicates that the top of the bars 68 is flush with the top edge 56 of the gas-air pipe.

Due to the lower pressure P1 over the radial bars 68, there will be inward radial flow of secondary air flowing over the top edge of the outer wall 20, into the lower pressure space above the bars. There is also a lower pressure above the cover plate 52 (FIG. 2B) which results from the rapid upward annular flow of steam-air-gas mixture above the annular space 27. The horizontal dimension 72 of the bars 68 is of critical importance and should be at least two inches so as to form separated circular segments of gas flow. This gas flow 26A is similar, with respect to the bars 68, as the straps 50 were to the flow of steam-air providing quiescent spaces between the flows 58 through each of the windows between the steam-air pipe 20 and the top plate 52.

The pressure P2 below the bars 68 is above atmospheric, due to the velocity of the gas flow. The pressure P1 will be below atmospheric by about the same magnitude that P2 is above atmospheric.

Because of the lower pressure P1 over the cover plate 52, and over the bars 68 there is a radially inward flow of atmospheric combustion air over the bars 68 to the space over plate 52. There will also be a downward flow of air into this space above 52 from above the flame. These supplies of secondary combustion air will assist in combustion along the inner wall of the annular segments of steam-air-gas and flame.

In addition, the quiescent space 57 between the flows 58 (FIG. 2B) provide for upward flow of gas through the spaces 57 and radially inwardly to the low pressure space P1 above the plate 52.

What has been described is a system for providing for tubulent mixing of a central cylinder of steam-air flowing radially outwardly to an annular flow of waste gas surrounding the central column. Secondary air is provided by flow radially inwardly over the top edge of the flare due to the presence of the low pressure P1, causes inflow downwardly of air from above into the space above the plate 52, for the support of combustion of the inner surface of the annular flow of steam-air-gas mixture. The radial bars 68 further supply means for secondary air flow over the top of the outer wall 20 to the lower pressure space P1 above the radial bars, and into the central column above the plate 52. All of these features plus the well known feature of radial flow of steam air through an annular wall of gas all make for improved turbulent mixing of the steam-air with gas, to the end of having complete and smokeless combustion.

The air manifold is provided for two purposes, to provide the piezometric properties to maintain a constant steam-air ratio, and also to attenuate the noise generated by the high pressure jets of steam.

While the invention has been described with a certain degree of particularity, it is manifest that many changes may be made in the details of construction and in the arrangement of components. It is understood that the invention is not to be limited to the specific embodiments set forth herein by way of exemplifying the invention, but the invention is to be limited only by the scope of the attached claims, including the full range of equivalency to which each element or step thereof is entitled.

What is claimed is:

1. An improved combustion apparatus for smokeless combustion of waste gases, comprising;
   (a) a vertical flare stack of selected height and diameter having an outer steel wall; a top portion of selected length called a combustion portion;
   (b) a coaxial central steam-air pipe of selected diameter supported inside said outer wall, closed off at its bottom end, and extending upwardly almost to the top of said outer wall;
   (c) a plurality of circumferentially spaced radial steam-air tubes, of selected diameter inserted through the wall of said steam-air pipe near its bottom end, and said outer steel wall; said steam-air pipe supported concentrically at its top end by a plurality of radial bars of selected circumferential width, positioned between said steam-air pipe out to and through said outer wall;
   (d) steam and air manifold means surrounding said outer wall and enclosing the outer ends of said steam-air tubes; for flow of primary combustion air and steam to said steam-air pipe;
   (e) the top of said steam-air pipe covered with a baffle plate of selected diameter, supported above the top of said steam-air pipe a selected distance, by a selected plurality of support legs of selected circumferential width, circumferentially spaced; said manifold adapted to receive a supply of steam at a selected pressure, and air, said stack adapted to receive a flow of waste gas of selected flow rate.

2. The flare apparatus as in claim 1 in which the diameter of said outer wall of said combustion portion is increased in diameter by a selected amount so as to provide substantially the same annular cross-section for upward flow of gas, as provided by said circular stack.

3. The flare apparatus as in claim 1 in which the outer ends of said steam-air tubes, projecting outwardly from said outer wall, are surrounded by steam plena, which are adapted to receive steam at a selected pressure.

4. The flare apparatus as in claim 3 and including orifice means in the walls of said steam air tubes near their outer end, to provide high velocity jets of steam from said plena to aspirate the air flow into the open outer ends of said tubes from said air manifold.

5. The flare apparatus as in claim 4 in which the axes of said steam jets are adapted to converge and to intersect at a point on the axes of said tubes downstream of said orifices.

6. The flare apparatus as in claim 1 in which said air manifold is a piezometric chamber comprising an annular box of rectangular construction comprising top and bottom annular plates, an outer cylindrical wall, having a plurality of large openings for flow of primary combustion air into said manifold; a circular curtain supported by said top annular plate at a selected radius, said curtain short enough to leave a space for flow of air between the bottom of said curtain and said bottom annular plate.

7. The flare as in claim 6 in which the number of openings comprises an even number, and said openings are equally circumferentially spaced.

8. The flare apparatus as in claim 1 in which said legs which support said cover of said steam-air pipe are at least one inch wide.

9. The flare apparatus as in claim 1 in which said radial arms are at least two inches wide, and are V-shaped, with the apex on the bottom sides of said arms.

* * * * *